May 9, 1933.  A. AMES, JR., ET AL  1,908,296
OPTICAL CORRECTION OF CYCLOPHORIA
Original Filed April 25, 1928
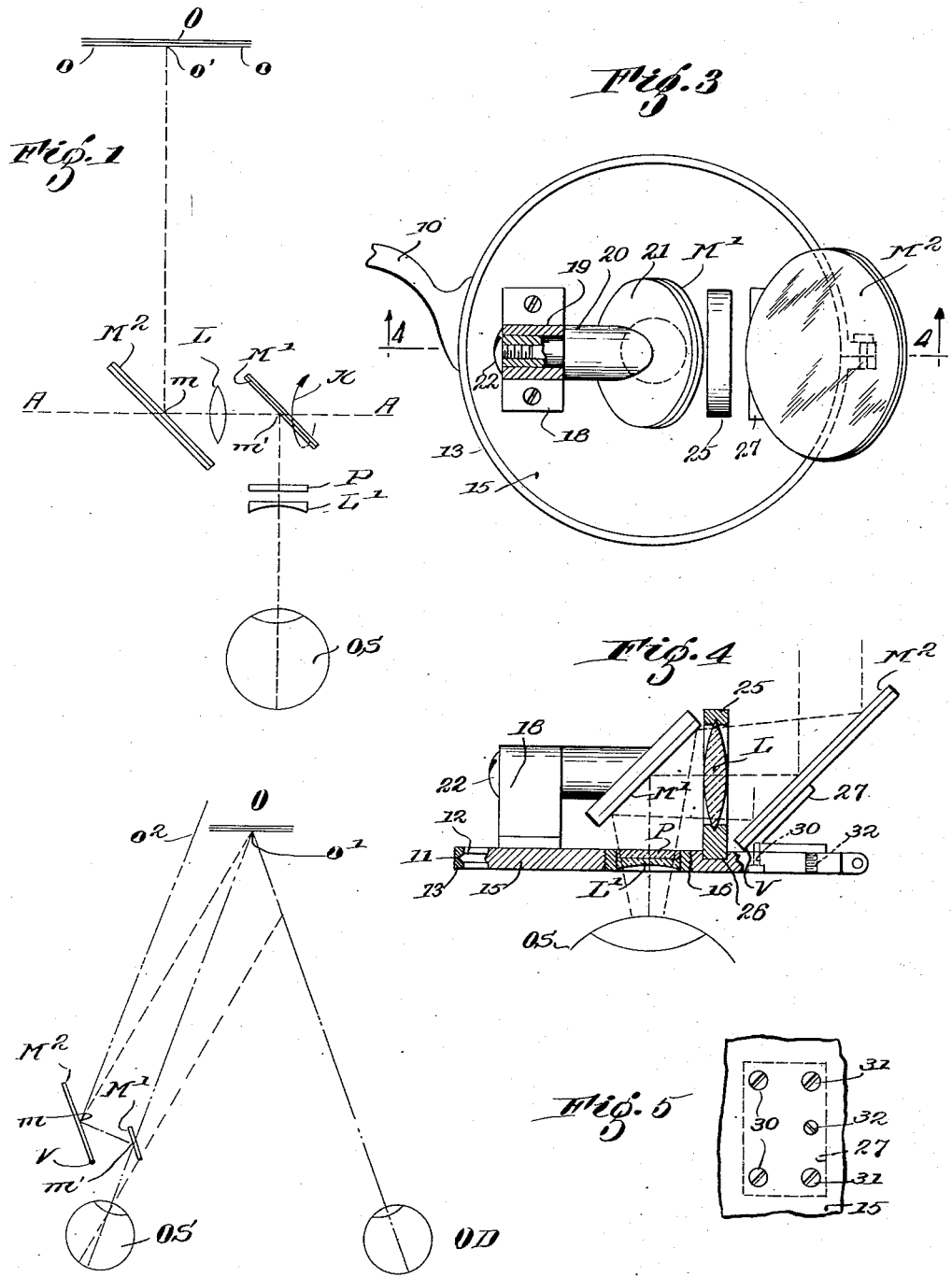
Inventors:
Adelbert Ames Jr.
Gordon H. Glidden
by Roberts, Cushman & Woodberry
Attorneys.

Patented May 9, 1933

1,908,296

UNITED STATES PATENT OFFICE

ADELBERT AMES, JR., AND GORDON H. GLIDDON, OF HANOVER, NEW HAMPSHIRE, ASSIGNORS TO TRUSTEES OF DARTMOUTH COLLEGE, OF HANOVER, NEW HAMPSHIRE, A CORPORATION OF NEW HAMPSHIRE

OPTICAL CORRECTION OF CYCLOPHORIA

Application filed April 25, 1928, Serial No. 272,687. Renewed December 22, 1931.

This invention relates to optical devices for the correction of certain abnormalities of vision in which one or both eyes fail to reach or are unduly strained in the effort to reach for vision coordinate positions in the sense of normal rotatory position in respect to the axis of vision. Such conditions, hereinafter mentioned as cyclophorias, are the often unsuspected cause of many grave conditions, which, so far as we are aware, have not heretofore been alleviated except by rare instances of surgery on the extrinsic eye muscles.

There are three possible turning movements of an eye; first, a turning movement in the horizontal plane about a vertical axis perpendicular to the visual axis; second, a turning movement in the vertical plane about a horizontal axis perpendicular to the visual axis; third, a turning movement of the eye about the visual axis itself.

Abnormal turning movements of the first two kinds have been much studied and can easily be caused or corrected by prisms placed perpendicular to the visual axis with their bases in or out or up or down. The effect of such prisms is to cause the field of view to turn about either a vertical or a horizontal axis perpendicular to the visual axis.

Abnormal turning movements of the third kind, called cyclo-versions or cyclo-torsions or cyclophoria, are more difficult to measure, and heretofore there has been no optical aid to counteract or correct them, for example, by causing an instrumental rotation of the field of view equal and opposite to the abnormal or pathological error of position. One object of this invention is to provide practical instrumental means for rotating the field of view of one or both eyes, and thus to permit the victim of this serious pathological condition practical use of his eyes for distance or near vision without the profound nervous strain, suffering and disability often accompanying this condition. Another object is to provide apparatus for rotating the field of view of one or both eyes capable of being mounted like other kinds of eyeglasses, on a suitable frame for wear.

In order to accomplish these objects, it will be clear that any arrangement of reflecting or refracting devices may be employed for the purpose of rotating the field of view with respect to the position of the pathological eye, but we have devised and prefer the genus of devices for this purpose illustrated by species about to be described as an example only of recommended devices.

In the accompanying drawing,

Fig. 1 is an exaggerated diagram in plan showing the relations in a horizontal plane of an object to be observed, an instrument for virtually rotating the field of view of the object, and an eye to be aided by the apparatus;

Fig. 2 is a similar diagram, also exaggerated in dimensions, in further explanation of some of the optical necessities of any apparatus for the general purpose of this invention;

Fig. 3 is a front elevation, partly in vertical section, of a recommended correction apparatus for a cyclophoria, shown as mounted on an eyeglass frame before the left eye of a subject for use either with another apparatus of the same kind or with any eyeglass lens for the right eye;

Fig. 4 is an under plan, partly in section, on the line 4—4 of Fig. 3; and

Fig. 5 is a detail rear elevation showing certain leveling screws.

Referring now to Fig. 1, supposing the patient's left eye OS to be either more affected or most convenient to correct, let us also suppose that an object O has a horizontal mark or structure at $o, o$. The diagram shows apparatus for virtually rotating the optical image in the eye OS of the line $o, o$ by the device of double reflection. For example, a surface reflecting plane reflector $M^2$ may receive the incident light from the object and a surface reflector $M^1$ may reflect the light into the eye. One result of this will be to transpose the vertical axis of the eye in the direction joining points on the reflected optical axis through the distance $m, m'$. This virtually places the patient's left eye further away from the vertical plane midway between that eye and the right eye, but this is of no consequence if suitable adjustments in azimuth are performed or permitted at the eye OS. So long as the planes of the reflectors $M^2$ and $M^1$ are parallel and vertical, the image of the line $o, o$ of the object O will apparently lie in a horizontal direction to a normal eye OS. But by the conditions of our problem, the tendency of the eye OS is to visualize the line $o, o$ as if it were not horizontal, but rotated on the line $m, o'$, a continuation of the axis of the eye OS through a certain degree, possibly as much as from two to five or more degrees of arc. It is therefore desired to rotate the appearance of the horizontal line $o, o$ in the object by an alteration of parallelism between mutual reflecting surfaces $M^1$ and $M^2$. By preference the reflector $M^1$ nearer the eye is rotated about the axis $A, A$, which is a continuation of the optical axis for fixation on the point $o'$ of the object by reflection. The effect of this rotation will, of course, be to swing the surface $M^1$ so that the continuation $m, m'$ of the optical axis by reflection will no longer be horizontal. If rotation is in the direction indicated by the dotted arrow $k$, for example, no other surface of the system being altered, the point $o'$ in the line $o, o$ would appear to the observer as if moved downwardly and also as if rotated clockwise through twice the angle of the rotation $k$. To correct a cyclophoria of two and one-half degrees the reflector $M^1$ may therefore be rotated on the horizontal lateral axis $A, A$ through 1.25°. The apparent downward swing of the object on this motion, if uncorrected, would introduce a vertical phoria by calling for a turning upward of the OS through the amount of the apparent lowering of the line $o, o$. To correct this virtual displacement of the field, that is to say, to bring the center of field back to where it was before the reflector $M^1$ was rotated, the axis of the mirror $M^1$ might be vertically displaced, but we prefer to make the correction by refraction by the introduction into the system comprising the reflectors $M^1$ and $M^2$ and the eye OS of a prism P having an angle between its plane faces sufficient to bend incident light through the amount of the virtual displacement downwardly at the point $o'$ in the line $o, o$. In the instance mentioned, of rotation in the direction $k$, the base of the prism P would be down. If, however, the direction of the cyclophoria of eye OS were different, and the adjustment at reflector $M^1$ were opposite to the direction $k$, then the prism P could be placed with its base up, with the same effect, which is again to bring into virtual coincidence the vertical position of $o'$ in the object from the image and that from a normal right eye.

By the device of the reflectors $M^2$ and $M^1$ the distance of the object O has been virtually increased by the distance $m, m'$. This may be counteracted in any desired way, but, since often the eye OS should be refractorily corrected for errors of focus, we prefer to provide a weak Galilean telescope having an objective lens L (which may conveniently be placed with its axis coincident to that part of the axis $A, A$ between the points $m, m'$) and having a negative lens $L^1$ between the prism P and the eye.

For objects further off than a distance beyond which the convergence angle is not materially changed with the distance, or even of the hyperfocal distance of the eyes, the system as described without the lens L and without the lens $L^1$ is ample. But, as is often the case, practicable correction for a seriously disturbed patient of a single or double cyclophoria is most important in order to enable the victim to read, and in that case the virtual addition of the distance from the principal points of the eye to the object of the distance $m, m'$ is of importance; and we have also to consider the problem of altered convergence of the eyes due to horizontal displacement of the optical axis through the distance $m, m'$. This will be clear from Fig. 2.

If we suppose the point $o'$, Fig. 2, to represent a nearby object O then the eyes OD and OS, if normal, would converge as indicated through the angles OS, $o'$, OD. If now a correction for cyclophoria is made according to the diagram in Fig. 1, the normal position of the eye OS for convergence at $o'$ will not produce convergence, because of the displacement at $m, m'$, but result in a duplex image of the point $o'$ and the point $o^2$ displaced from the point $o'$ by the distance $m, m'$. For nearby vision, therefore, it is desirable to adjust the reflector $M^2$ by one-half the angle $m, o', m'$, and for this purpose it is convenient to rotate the mirror $M^2$ about a vertical axis at $v$. This brings the position in azimuth of the axis of the eye OS to the normal place. But it will be apparent that if either eye of the patient is subject to a horizontal phoria, this may be taken into account in adjusting the reflector $M^2$ about the vertical axis $v$, and may thus be corrected for in addition to the correction for the cyclophoria effected by rotation of the reflector $M^1$. It will be understood that the telescopic lens system $L, L^1$ may not only correct for the addition of the distance $m, m'$ to the distance of the object from the eye, but may also be adjusted to correct for any error of focus of that eye.

In the apparatus about to be described the distance $m, m'$ by which the virtual interpupillary distance is increased is held to a very small figure, such for example as twenty to twenty-five millimeters, without difficulty, as will be apparent from the instance of construction about to be described. It will be observed that the effect of the Galilean telescope recommended to be introduced into the optical system is merely to move the nodal point of the eye forward, and thus to increase the size of the image formed on the retina without affecting the other optical relations.

Referring now to Figs. 3 and 4, an ordinary eyeglass frame 10 having a lens-mount 13 with a channel 11 to take over rib 12 of a circular plate 15 may be provided. The plate 15 is bored and threaded at 16 for a cell carrying the prism P and the lens $L^1$, if these are to be used; they may merely be left off for distance vision. A standard 18 having in it a hole 19, whose horizontal axis intersects that of the opening 16, a rotary stud 20 integral with or attached to a backing 21 for a preferably silver-on-glass reflector $M^1$, may be provided with a headed clamp screw 22 adapted to fix the rotatively adjusted position of the reflector $M^1$. The surface $M^1$ is accurately set at 45° from the axis of the mounting stud 20.

In line with the axis of the hole 19 a mounting 25 fast in a milled slot 26 of the plate 15 provides a cell for the lens L, and in line with the axis of the lens L and the axis of the hole 19 and the mounting 20, a silver-on-glass reflector at $M^2$ may be carried by an angle plate or block 27, the apex of which defines the vertical axis $v$. Since rotative adjustment about the axis $v$ is small, a convenient way to provide for it is to provide hold-down screws 30 near the axis $v$ and on the opposite side of the base portion of the angle plate 27, as shown in Fig. 5, at 31. At 32 a round-point leveling screw may now be provided to tip the mounting 27 about the axis $v$ through the small angles necessary. The angle mounting 27 may, of course, be made to correspond closely to the correct angle for normal reading distance, for example, forty centimeters.

The apparatus mounted on the plate 15 may be rotated in the groove 11 of the mounting 13 for adjustment, and this adjustment may in part replace, counteract or correct the effect of the prism P. If the patient's ocular condition should require the device to be used on both eyes, it will be understood that the instrument for the right eye may be the same as that shown, but rotated through 180° in respect to the position illustrated in Fig. 3.

We claim:

1. Eyeglasses for the correction of a cyclophoria having mounted thereon light deflecting means having an element rotatably mounted for rotating the virtual position of the object field in respect to the optical axis of the adjacent eye so that the image will be inclined at an angle to its normal, uncorrected position.

2. Device for the optical correction of cyclophoria comprising reflectors respectively at angles to the optical axis of an eye, whereby vision of the object is along an axis bent by reflection in each of said reflectors, one of said reflectors having a mounting adapted to be turned about the axis of reflection between the reflectors to rotate the field of view of said eye and means for mounting the device for use as an eyeglass so that the image will be inclined at an angle to its normal uncorrected position.

3. In an eyeglass for the optical correction of a cyclophoria, means for rotating the image in an eye of the object field on the optical axis of fixation of a point in said field so that the image will be inclined at an angle to its normal, uncorrected position, and means for maintaining the apparent image of said point in vertical coincidence with the normal axial direction of said eye for fixation on said point.

4. In an eyeglass for the optical correction of a cyclophoria, means for rotating the image in an eye of the object field on the optical axis of fixation of a point in said field so that the image will be inclined at an angle to its normal, uncorrected position, and means for maintaining the apparent image of said point in lateral coincidence with the normal axial direction of said eye for fixation on said point.

5. In an eyeglass for the optical correction of a cyclophoria, means for rotating the image in an eye of the object field on the optical axis of fixation of a point in said field so that the image will be inclined at an angle to its normal, uncorrected position, and different means for maintaining the apparent image of said point in vertical and in lateral coincidence with the normal axial direction of said eye for fixation on said point.

6. Device for the optical correction of cyclophoria comprising a plate adapted to be mounted in an eyeglass frame and having thereon in fixed relation to an eye of the wearer a pair of reflectors, and means for turning one of the reflectors on the axial line of reflection between the reflectors of light between an object and the axis of the eye when positioned normally for fixation on that object.

7. In a device for the optical correction of a cyclophoria the combination of a Galilean telescope having an objective axial on a lateral horizontal line and a negative ocular at right angles thereto, of a reflector on the axis of each of said lenses, a reflector at an angle to and exterior to the telescopic lenses, and means for rotating said first-mentioned reflector about the axis of one of said lenses.

8. In a device for the optical correction of a cyclophoria the combination of a Galilean telescope having an objective axial on a lateral horizontal line and a negative ocular at right angles thereto, of a reflector on the axis of each of said lenses, a reflector at an angle to and exterior to the telescopic lenses, means for rotating said first-mentioned reflector about the axis of one of said lenses, and means for rotating the other reflector through slight angles on a vertical axis.

9. In a device for the optical correction of a cyclophoria the combination of a Galilean telescope having an objective axial on a lateral horizontal line and a negative ocular at right angles thereto, of a reflector substantially bisecting the exterior angles between the axes of said lenses, means for rotating said reflector about and fixing it in adjusted relation in respect to one of said axes, a reflector at an angle to and exterior to the telescopic lenses, and means for rotating said last-mentioned reflector about a vertical axis.

10. In a device for the optical correction of a cyclophoria the combination of a Galilean telescope having an objective axial on a lateral horizontal line and a negative ocular at right angles thereto, of a reflector between the lenses adapted for rotation on the axis of one of them, a reflector beyond the objective in a vertical plane and inclined to said axis, and refractive means for correcting the virtual vertical displacement of the object due to rotation of said reflector.

11. In a device for correcting the error of cyclophoria of an eye means for deflecting the image of an object into the eye, and means for rotating the deflected image about the axis of deflection.

12. In a device for correcting the error of cyclophoria of an eye, means for deflecting the image of an object into the eye, means for rotating the deflected image, and means for compensating for the displacement of said image due to said rotation thereof.

13. In a device for correcting the error of cyclophoria of an eye, means for deflecting the image of an object into the eye, means for rotating the deflected image about the axis of deflection, and means for compensating for the displacement of said image due to said rotation thereof.

14. In a device for correcting the error of cyclophoria of an eye, a pair of light deflectors in fixed relation to the eye, and means for turning one of the deflectors on the axial line of deflection between the deflectors of light between an object and the axis of the eye when positioned normally for fixation on that object.

15. In a device for correcting the error of cyclophoria of an eye, a pair of light deflectors for deflecting an image into the eye, and means for turning one of said deflectors about the line of sight between said deflectors to rotate the deflected image about the axis of deflection.

Signed by us at Hanover, New Hampshire, this twentieth day of April, 1928.

ADELBERT AMES, JR.
GORDON H. GLIDDON.